(12) United States Patent
Murphy

(10) Patent No.: US 9,242,803 B2
(45) Date of Patent: Jan. 26, 2016

(54) FOLDING MECHANISM

(71) Applicant: Terex GB Limited, Dungannon (GB)

(72) Inventor: Glenn Murphy, Craigavon (GB)

(73) Assignee: Terex GB Limited, Dungannon, County Tyrone (GB)

( * ) Notice: Subject to any disclaimer, the term of this patent is extended or adjusted under 35 U.S.C. 154(b) by 134 days.

(21) Appl. No.: 14/073,065

(22) Filed: Nov. 6, 2013

(65) Prior Publication Data

US 2014/0124337 A1    May 8, 2014

(30) Foreign Application Priority Data

Nov. 8, 2012    (GB) .................................. 1220152.1

(51) Int. Cl.
| | | |
|---|---|---|
| B65G 21/10 | (2006.01) | |
| B65G 21/20 | (2006.01) | |
| B02C 21/02 | (2006.01) | |
| B02C 23/02 | (2006.01) | |

(52) U.S. Cl.
CPC ............ *B65G 21/2081* (2013.01); *B02C 21/02* (2013.01); *B02C 23/02* (2013.01)

(58) Field of Classification Search
CPC ...................................................... B65G 21/14
USPC .......................................... 198/632, 581, 313
See application file for complete search history.

(56) References Cited

U.S. PATENT DOCUMENTS

| | | | | |
|---|---|---|---|---|
| 6,360,990 | B1* | 3/2002 | Grossman ................. | 244/102 R |
| 2010/0213033 | A1* | 8/2010 | Trimble ...................... | 198/586 |
| 2011/0091267 | A1* | 4/2011 | Hill ............................... | 403/31 |

\* cited by examiner

*Primary Examiner* — Gene Crawford
*Assistant Examiner* — Lester Rushin
(74) *Attorney, Agent, or Firm* — Warner Norcross & Judd LLP

(57) ABSTRACT

A folding mechanism comprising
  a first support;
  a second support pivotably coupled to the first support;
  an actuator operable to pivot said second support relative to said first support about a first pivot axis between a deployed position and a folded position; and
  an elongate support strut extending between said first and second supports, the support strut being adapted to permit movement of said second support about said first pivot axis when the support strut is in a first state, the support strut being adapted to retain said second support in said deployed position when the support strut in a second state;
  the support strut being coupled to the actuator such that the support strut is reconfigured between its first and second states as the actuator is operated to pivot the second support between its folded and deployed positions.

11 Claims, 5 Drawing Sheets

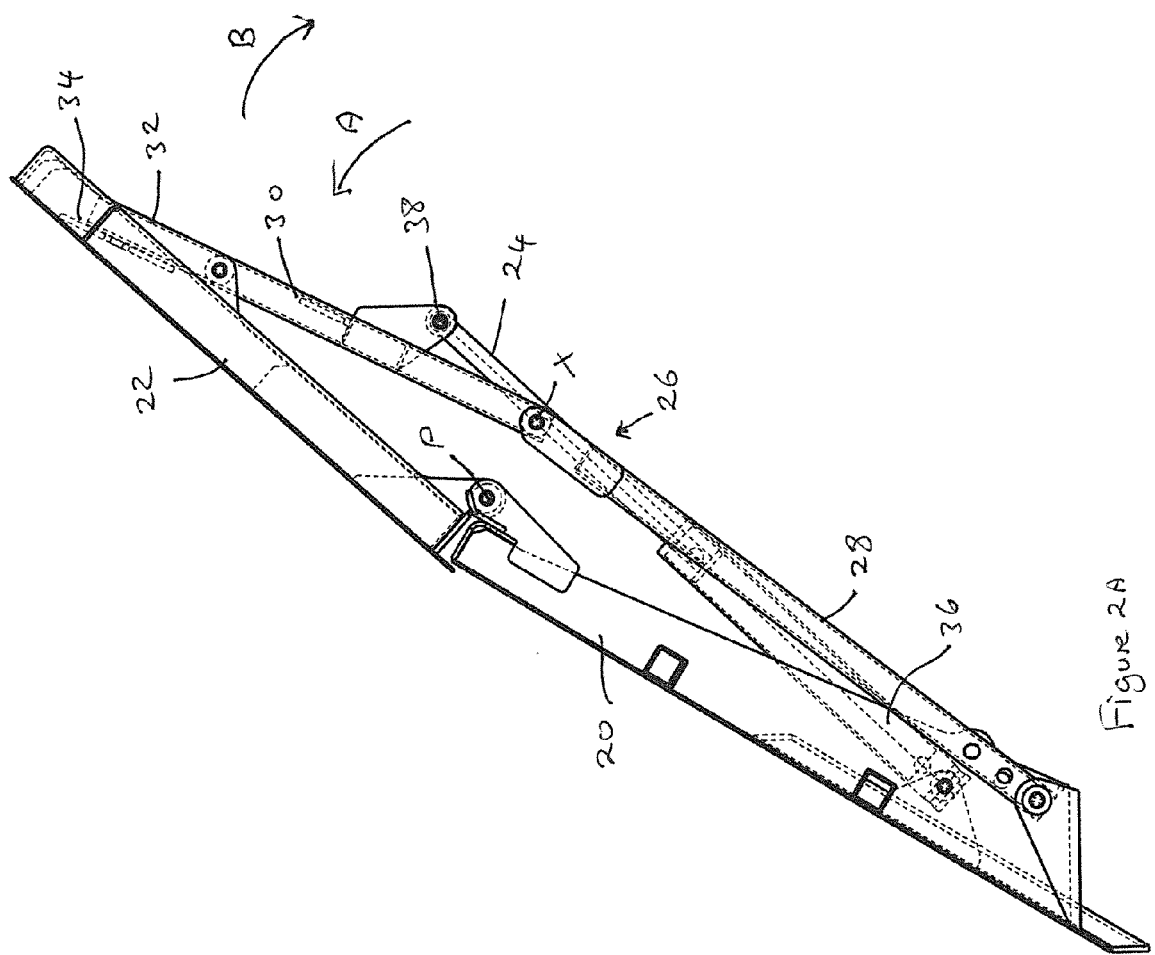

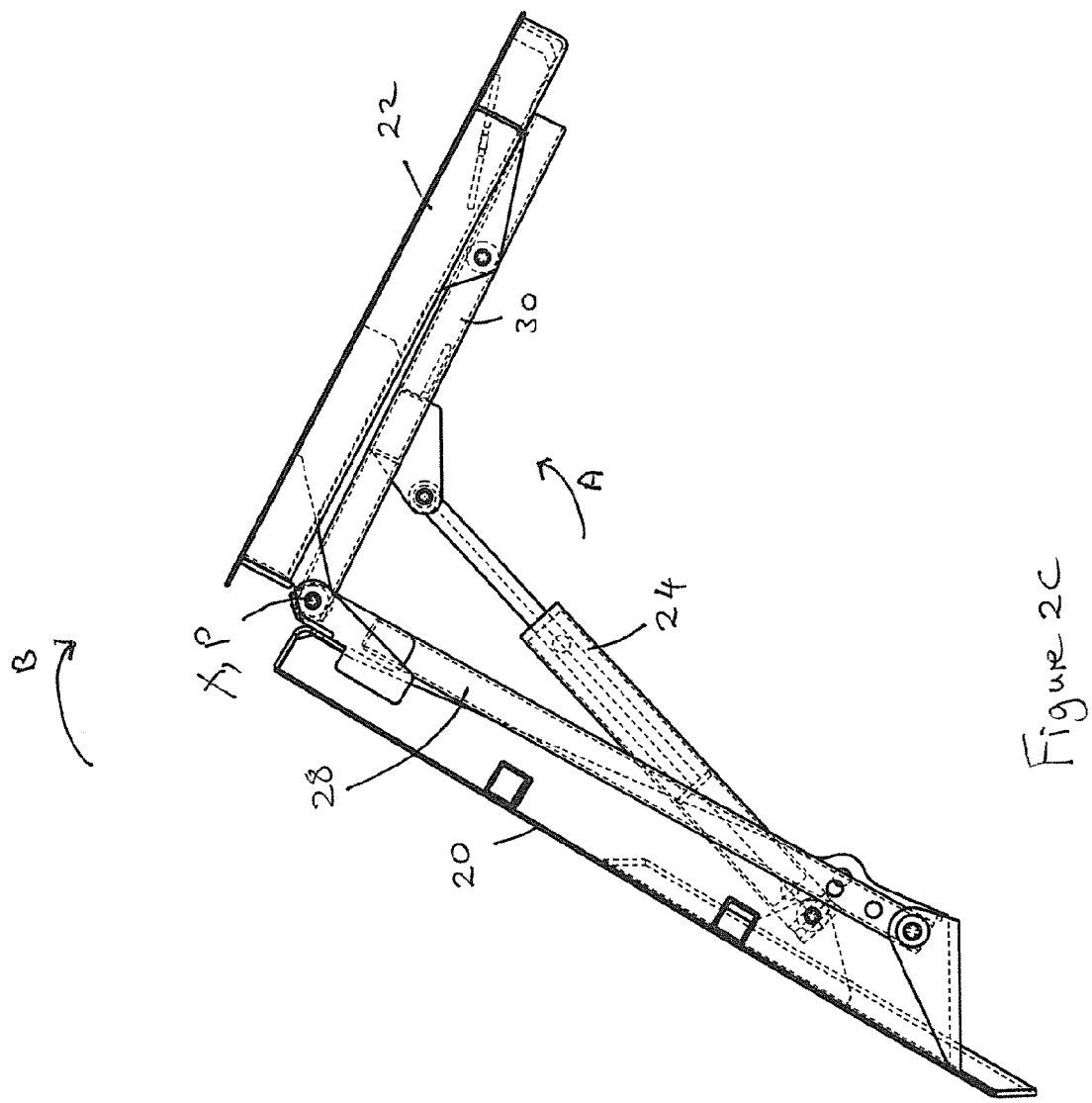

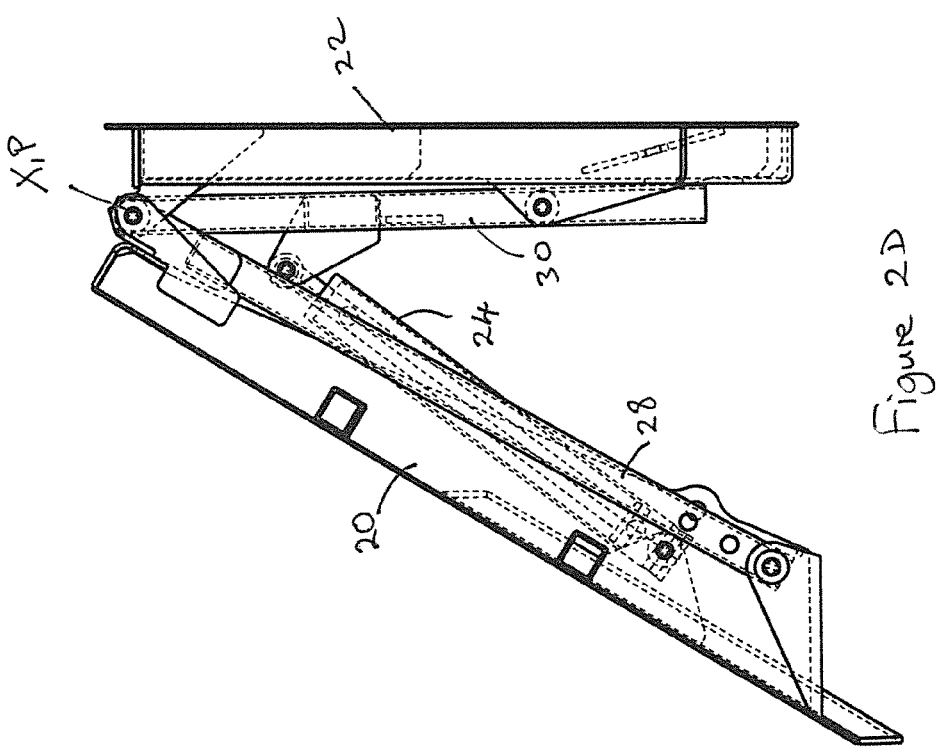

FOLDING MECHANISM

FIELD OF THE INVENTION

The present invention relates to folding mechanisms, especially but not exclusively for use with foldable or otherwise movable components of aggregate or other material processing apparatus. The invention relates particularly but not exclusively to folding mechanisms for foldable hopper flares.

BACKGROUND TO THE INVENTION

An aggregate processing apparatus may include foldable components, such as conveyors and hopper flares, that are folded during transport in order to reduce the overall dimensions of the apparatus. It is desirable to lock such components in their deployed and/or transport states. Typically, locking is achieved by manually inserting a wedge or pin into a suitable crevice or aligned pair of apertures.

It would be desirable to provide an improved folding mechanism particularly, but not exclusively, for use with foldable or movable components of aggregate or other material processing apparatus, especially hopper flares, where manual locking of the folding mechanism is not required to maintain the foldable components in a desired orientation or position.

SUMMARY OF THE INVENTION

A first aspect of the invention provides a folding mechanism comprising
a first support;
a second support pivotably coupled to the first support;
an actuator operable to pivot said second support relative to said first support about a first pivot axis between a deployed position and a folded position; and
an elongate support strut extending between said first and second supports, the support strut being adapted to permit movement of said second support about said first pivot axis between its deployed and folded positions when the support strut is in a first state, the support strut being adapted to retain said second support in said deployed position when the support strut in a second state;
the support strut being coupled or otherwise linked to the actuator such that the support strut is reconfigured between its first and second states as the actuator is operated to pivot the second support between its folded and deployed positions.
Preferably the support strut comprises
a first member pivotally coupled to the first support at a second pivot axis; and
a second member pivotally coupled to the second support at a third pivot axis;
the first and second member of the support strut being pivotally coupled together for relative movement about a fourth pivot axis;
the distance between first pivot axis and the second pivot axis being equal to the distance between the second pivot axis and the fourth pivot axis, the distance between the first pivot axis and the third pivot axis being equal to the distance between the fourth pivot axis and the third pivot axis;
the fourth pivot axis being coincident with the first pivot axis when the support strut is in its first state;
the fourth pivot being spaced from the first pivot axis and the first and second supports and first and second members of the support strut defining between them a kite quadrilateral when the support strut is in its second state.

At least one of the first and second members may interact with a respective one of the first and second supports when the support strut is in its second state to limit displacement of the pivot axis of the support strut away from the pivot axis of the second support. Alternatively the pivotal connection between the first and second members of the support strut may be adapted to limit displacement of the pivot axis of the support strut away from the pivot axis of the second support. In a preferred embodiment a distal end of the second member of the support strut may engage a portion of the second support such that the support strut supports the second support in its deployed position.

Preferably the second support is arranged to pivot with respect to the first support from its folded to its deployed positions in a first direction, means being provided for limiting said pivotal movement of the second member with respect to said first member in said first direction, wherein the support strut is arranged such that the second pivot, fourth pivot and third pivot are arranged on a common line when said second member reaches the limit of pivotal movement thereof defined by said limiting means, such that the support strut is reconfigured between its first and second states in over-centre manner when the second member reaches said limit of pivotal movement thereof.

In one embodiment the actuator comprises a linear actuator, preferably a double acting hydraulic ram. Preferably the actuator extends between the first support and the second member of the support. Preferably the actuator is coupled to the first support at a location between the first pivot axis and the second pivot axis such that extension of the actuator to a fully extended position displaces the support strut to its first state to its second state.

A second aspect of the invention provides a material processing apparatus comprising at least one foldable component being foldable by at least one folding mechanism of the first aspect of the invention.

A third aspect of the invention provides a hopper for a material processing apparatus, said hopper comprising at least one foldable flare and at least one folding mechanism of the first aspect of the invention for folding said at least one foldable flare.

Preferred features are recited in the dependent claims. Further advantageous aspects of the invention will become apparent to those ordinarily skilled in the art upon review of the following description of a preferred embodiment and with reference to the accompanying drawings.

BRIEF DESCRIPTION OF THE DRAWINGS

Embodiments of the invention are now described by way of example and with reference to the accompanying drawings in which like numerals are used to indicate like parts and in which:

FIGS. 2A-2D are side views said folding mechanism shown respectively in an unfolded state, first and second intermediate states and a folded state.

DETAILED DESCRIPTION OF THE DRAWINGS

Figure 1:
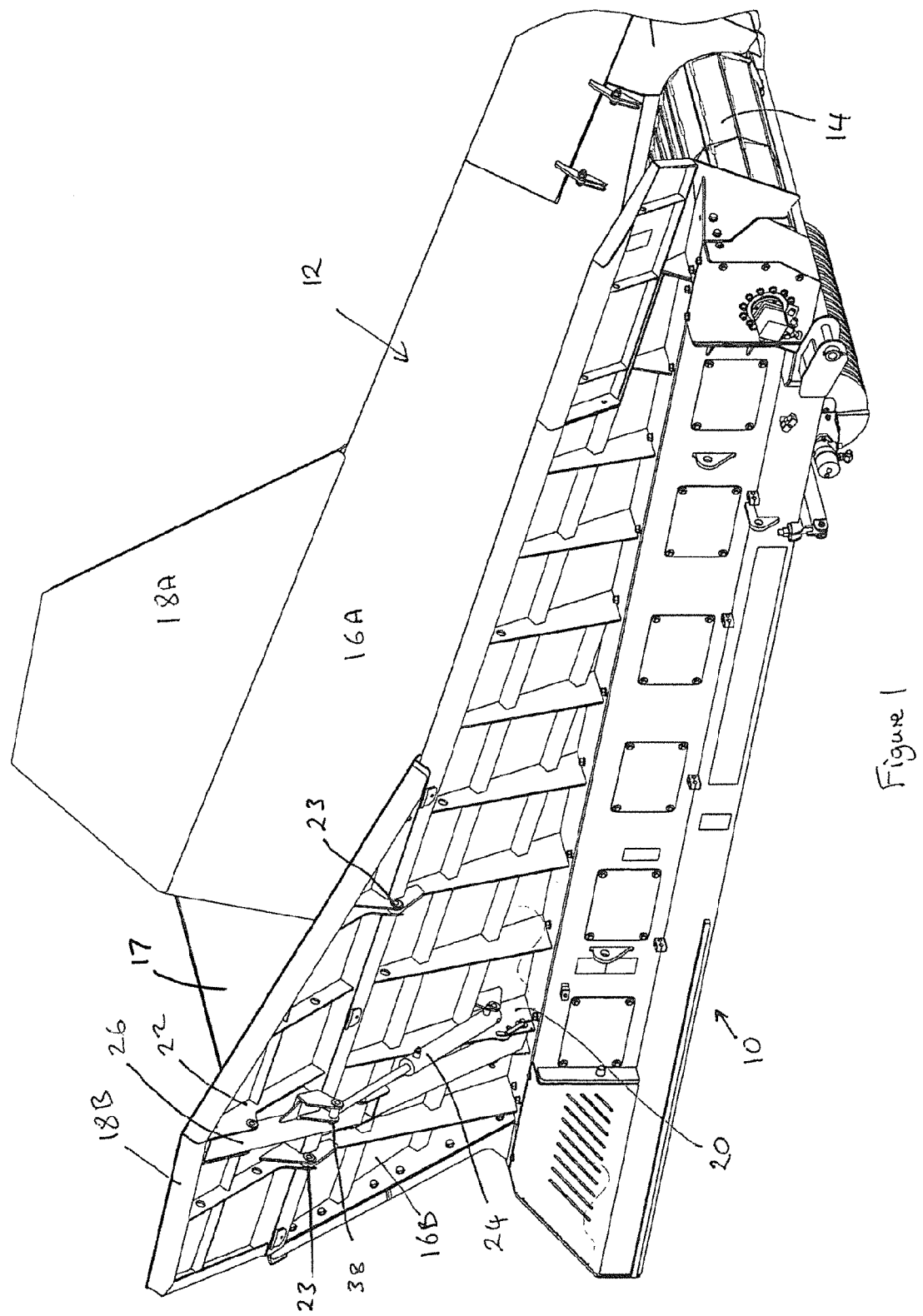
FIG. 1 is a perspective view of an aggregate processing apparatus including a hopper having foldable flares incorporating at least one instance of a folding mechanism embodying one aspect of the invention.

Referring now in particular to FIG. 1 of the drawings, there is shown, generally indicated as 10, a feed apparatus of a material processing apparatus. The material processing apparatus may be configured for performing, by way of example, material screening and, as such, comprises a materials processing plant (not visible), e.g. a screening plant or crushing plant. More generally, the apparatus may be configured to perform one or more of a plurality of processes, such as feeding, screening, separating, crushing, waste recycling or demolition and/or washing, on one or more types of aggregate or other material, for example rocks, stones, gravel, sand and/or soil, or any other material that is quarried, mined or excavated. To this end, the apparatus may include one or more material processing plants adapted to perform one or more of the foregoing processes.

The feed apparatus 10 comprises a hopper 12, which in this example is located above a conveyor 14. It will be understood that the invention is not limited to apparatus of the type shown in FIG. 1, and may for example be used with other configurations of material processing plant(s) and/or conveyor(s).

Typically, the hopper 12 comprises a body defined by a pair of opposed outwardly diverging side wall sections 16A, 16B arranged on either side of the conveyor 14, and at at least one end 17 wall adjacent a feed end of the conveyor 14 for guiding material onto the conveyor 14. A respective wall extension 18A,18B is provided on each side wall 16A,16B of the hopper 12 adjacent the feed end of the conveyor 14 for pivotal movement with respect to the respective side wall 16A,16B between a deployed state, shown in FIG. 1, and a folded state. When in the deployed state, the wall extensions 18A,18B extend the height of the side walls 16A,16B of the hopper at the feed end of the conveyor 14. The wall extensions 18A,18B are commonly referred to as flares 18A,18B.

In their deployed state, the height of the flares 18A,18B can be problematic when transporting the apparatus 10. Each flare 18A,18B can therefore be moved to a adopt a folded, or transport, state in which it extends downwardly from the adjacent side wall 16A,16B of the hopper 12. Conveniently, this is achieved by configuring the flares 18A,18B to fold with respect to the hopper 12, typically by means of one or more folding mechanism. In the folded state (FIG. 2D) the flares 18A,18B extend alongside a respective side of the apparatus 10, and are typically substantially parallel with the respective side. Advantageously, the flares 18A,18B are located close, e.g. substantially against or substantially parallel with, the body of the hopper 12 at the respective side when folded to minimize the overall dimensions of the apparatus 10.

A lockable folding mechanism embodying one aspect of the present invention and is shown in more detail, and in operation, in FIGS. 2A to 2D. The folding mechanism comprises first and second supports 20,22 pivotably coupled to one another. The supports 20,22 may take any suitable form, typically comprising a post, frame, beam or other structure. Typically, in use, one of the supports 20 (hereinafter the base support 20) serves as a base with respect to which the other support 22 (hereinafter the pivot support 22) can pivot.

In the illustrated embodiment, the base support 20 is fixed with respect to a respective side wall 16A,16B of the hopper body. For example it may be mounted on, fixed to, carried by or otherwise coupled to the respective side of the hopper body and/or other part of the apparatus. More generally, the base support 20 may be fixed to any suitable base structure, the pivot support 22 then being pivotable with respect to the base structure.

The pivot support 22 is coupled to the object that it is desired to fold. In the illustrated embodiment, pivot support 20 is fixed to a respective flare 18A,18B, a part of which is shown in FIGS. 2A to 2D.

The supports 20, 22 are pivotably coupled to one another at a pivot axis P by suitable hinge means. For example, the pivot coupling may comprise one or more pivot pins 23 passing through respective apertures formed in cooperating parts of each of the supports 20,22. Adjacent ends of the supports 20,22 adjacent the pivot pin 23 are adapted to abut one another to limit pivotal movement of the support 20,22 with respect to one another to limit pivotal movement of the pivot support 22 in a direction A (see FIGS. 2A-2D).

Figure 2B:
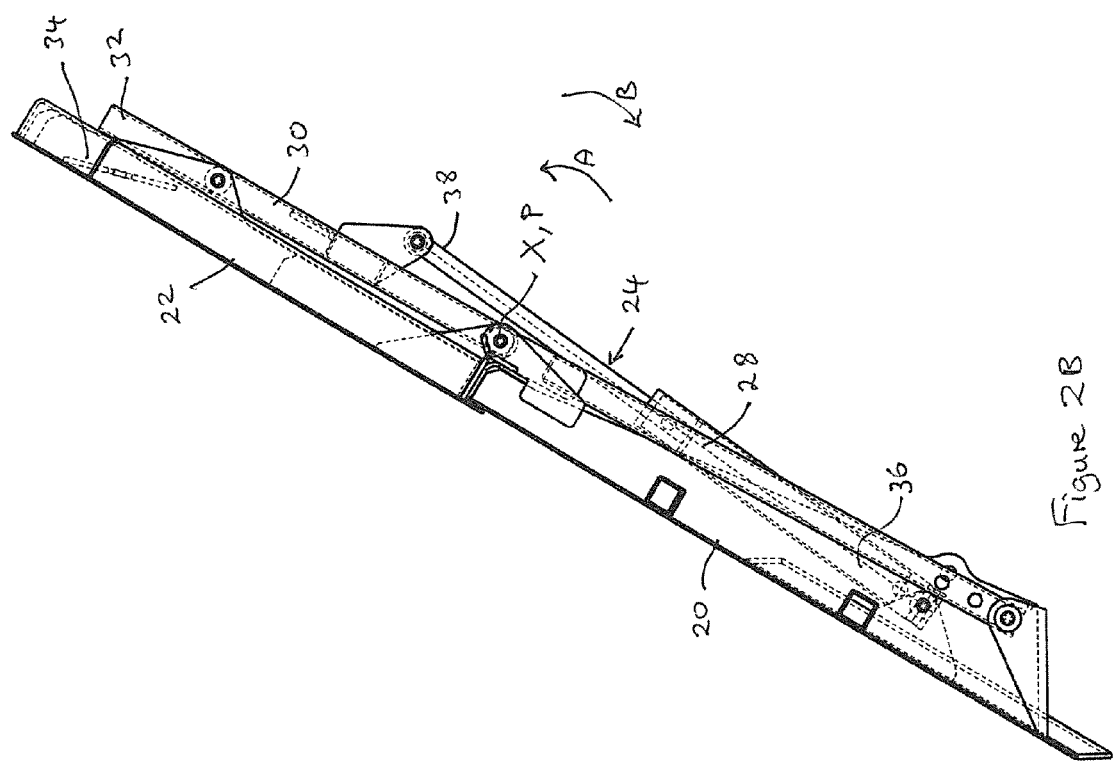

In FIGS. 2A and 2D the folding mechanism, and more particularly the pivot support 22, is shown in a deployed state and a folded state respectively. FIGS. 2B and 2C shows the folding mechanism, and more particularly the pivot support 22, in intermediate (or partially folded) states between the deployed and folded states. It will be apparent that the pivot support 22 adopts a series of successive intermediate (or partially folded) states as it moves between the deployed and folded states, of which FIGS. 2B and 2C illustrates just two.

An actuating system is provided for moving the folding mechanism between the deployed and folded states. The actuating system comprises an actuator 24 acting between the base and pivot supports 20,22 via a support strut 26. In use, the actuator 24 imparts movement to the pivot support 22 via the support strut 26 causing the pivot support 22 to pivot about pivot axis P. Advantageously, the actuating system is configured to lock the pivot support 22 in its deployed state, as is described in more detail hereinafter.

The support strut 26 comprises a first elongate member 28 pivotally coupled to the base support 20 and a second elongate member 30 pivotally coupled to the pivot support 22, the first and second members 28,30 being pivotally coupled together at a pivot axis X. As will be described in more detail below, the support strut 26 is adapted to be displaced between a locked state, shown in FIG. 2A, wherein the support strut 26 is adapted to support the pivot support 22 in its deployed state, and an unlocked state, shown in FIGS. 2B to 2D, wherein the pivot support 22 is free to pivot between its deployed and folded states.

When in its locked state, the first and second members 28,30 of the support strut 26 and the base and pivot supports 20,22 between them define a kite quadrilateral, with the pivot axis P of the pivot support 22 spaced from the pivot axis X of the support strut. In such configuration, a distal end 32 of the second support member 30 engages an abutment 34 formed on the pivot support 22 such that at least part of the weight of the pivot support 22 can be transferred to the base support 20 via the support strut. The support strut 26 acts as an overcentre dog leg strut, the engagement of the distal end 32 of the second member 30 of the support strut 26 when in its locked state preventing further movement of the pivot axis X of the support strut 26 away from the pivot axis P of the pivot support 22.

The respective lengths of the first and second members 28, 30, in particular the distance between the pivotal connection of the first member 28 with the base support 20 and the pivot axis P and the distance between the pivotal connection of the second member 30 with the pivot support 22 and the pivot axis P, are arranged such that, when the support strut is in its unlocked state, the pivot axis P of the support strut is coincident with the pivot axis X of the of the pivot support 22, allowing the pivot support 22 and the second member 30 of the support strut 26 to pivot together about the pivot axis X. When the support strut 26 is in its unlocked state, the first and/or second members 28,30 of the support strut 26 may be arranged to abut the base support 20 and/or pivot support 22 respectively.

As best seen from FIG. 2B, the base support 20 and pivot support 22 are arranged to abut one another to limit pivotal movement of the pivot support 22 with respect to the base support in a position wherein the pivotal connection of the first member 28 of the support strut 26 with the base support 20, the pivotal connection of the second member 30 with the support strut 26 and the pivot axis X of the support strut 26 are in alignment with each other such that, when the base support 20 and pivot support are in such position, extension or retraction of the actuator is able to displace the support strut 26 between its locked and unlocked states in over-centre manner, as will be described below in more detail.

The actuator 24 is coupled between the base support 20 and the second member 28 of the support strut 26. The arrangement is such that, in use, the actuator 24 acts on the support strut 26, displacing the support strut 26 between its locked and unlocked states as the actuator is operated to move the pivot support 22 between its folded and deployed states.

Any suitable actuating device or mechanism may serve as the actuator. The preferred actuator 24 comprises a linear actuator, e.g. a ram, preferably double-acting. In preferred embodiments, the actuator 24 is powered, typically hydraulically powered but any other convenient power means, e.g. pneumatic or electric power means, may be used. In other embodiments, resilient biasing means, e.g. one or more springs, may be used to power the actuator causing it to extend and/or retract. A combination of more than one power means may be employed, e.g. where the actuator is single acting, resilient biasing means being used to perform one of retracting or extending the actuator while another power means is used to perform the other.

Conveniently, one end 36 of the actuator is coupled to the base support 20, the other end 38 being coupled to the second member 30 of the support strut 26. Advantageously, the coupling of the actuator 24 to the base support 20 is pivotable, i.e. such that it allows the actuator 24 to pivot with respect to the base support 20, typically from the end 36. In the illustrated embodiment, the actuator 24 is coupled to the base support 20 by a pivot pin. The pivot axis of the actuator 24 is substantially parallel with the pivot axis P of the pivot support 22. The pivot axis of actuator 24 on the base support 20 is located between the pivot axis defined by the coupling of the support strut 26 on the base support 20 and the pivot axis P of the pivot support 22. The base support 20 is fixed, i.e. does not move as part of the folding operation and is not movable by the actuator 24.

The operation of the folding mechanism will now be described with reference to FIGS. 2A to 2D.

When the pivot support is in its deployed position, as shown in FIG. 2A and the support strut is in its locked position, with the pivot axis X of the support strut 26 spaced from the pivot axis P of the pivot support 22 and the distal end 32 of the second member 20 of the support strut 26 engaged with the abutment 34 of the pivot support 22, the pivot support 22 is supported on the base support via the support strut, thus maintaining the pivot support 22 in its deployed position.

When it is desired to move the pivot support 22 to its folded state, the actuator 24 is retracted from its fully extended position, shown in FIG. 2A. During initial retraction of the actuator 24, the support strut 26 is pulled towards the base support 20, displacing the pivot axis X of the support strut 26 towards the pivot axis P of the pivot support 22 until the pivot axis X is coincident with the pivot axis P, as shown in FIG. 2B, thus moving the support strut 26 from its locked state to its unlocked state. During such movement of the support strut from its locked state to its unlocked state, the pivot support 22 pivots with respect to the base support 20 about pivot axis P in a first direction A.

Once the support strut 26 is in its unlocked state, further retraction of the actuator 24 causes the pivot support 22 to pivot with respect to the base support 20 about pivot axis P in a second direction B, opposite the first direction A, the second member 30 of the support strut simultaneously pivoting about pivot axis X, now coincident with pivot axis P, with respect to the first member 28 of the support strut 26 in direction B, as shown in FIG. 2C.

Further retraction of the actuator 24 moved the pivot support 22 to its folded state, shown in FIG. 2D.

When it is desired to move the pivot support from its folded state to its deployed state, the actuator 24 is extended, pivoting the pivot support about pivot axis P with respect to the base support and also pivoting the second member of the support strut about pivot axis X, coincident with pivot axis P, in direction A.

Once the pivot support reaches the position shown in FIG. 2B, the pivot support 22 engages the base support 20, preventing further movement of the pivot support 22 in direction B. At the same time, the pivot axis of the first member 28 of the support strut 26 on the base support 20, the pivot axis X of the support strut 26, and the pivot axis of the second member of the support strut on the pivot support 22 become aligned, allowing the support strut to be moved from its unlocked state to its locked state in over-centre manner. Further extension of the actuator 24 thereafter displaces the support strut 26 away from the base support 20, moving the pivot axis X away from the pivot axis P and pivoting the pivot support 22 with respect to the base support 20 in direction A, until, at full extension of the actuator 24, the distal end 32 of the second member 30 of the support strut 26 engages the abutment 34 of the pivot support 22, whereby the support strut 26 is returned to its locked state, supporting the pivot support 22 in its deployed position.

Referring again to FIG. 1, one instance of the folding mechanism embodying the invention is provided for folding the flare 18A, 18B.

The invention is not limited to use with hopper flares. For example, one or more folding mechanisms embodying the invention may be used to fold other foldable components of a material processing apparatus, for example a conveyor, ramp, ladder, steps or walkway. The invention is not limited to use with aggregate processing apparatus and may alternatively be used to fold any structure.

The invention is not limited to the embodiments described herein which may be modified or varied without departing from the scope of the invention.

The invention claimed is:

1. A folding mechanism comprising:
a first support;
a second support pivotably coupled to the first support;
an actuator operable to pivot said second support relative to said first support about a first pivot axis between a deployed position and a folded position; and
an elongate support strut extending between said first and second supports, the support strut being adapted to permit movement of said second support about said first pivot axis when the support strut is in a first state, the support strut being adapted to retain said second support in said deployed position when the support strut in a second state; the support strut being coupled to the actuator such that the support strut is reconfigured between its first and second states as the actuator is operated to pivot the second support between its folded and deployed positions, wherein the support strut comprises:

a first member pivotally coupled to the first support at a second pivot axis; and a second member pivotally coupled to the second support at a third pivot axis;

the first and second member of the support strut being pivotally coupled together for relative movement about a fourth pivot axis;

the distance between first pivot axis and the second pivot axis being equal to the distance between the second pivot axis and the fourth pivot axis, the distance between the first pivot axis and the third pivot axis being equal to the distance between the fourth pivot axis and the third pivot axis;

the fourth pivot axis being coincident with the first pivot axis when the support strut is in its first state;

the fourth pivot being spaced from the first pivot axis, the first and second supports and first and second members of the support strut defining between them a kite quadrilateral, when the support strut is in its second state.

2. A folding mechanism as claimed in claim 1, wherein at least one of the first and second members interacts with a respective one of the first and second supports when the support strut is in its second state to limit displacement of the fourth pivot axis away from the first pivot axis, such that the support strut supports the second support in its deployed position.

3. A folding mechanism as claimed in claim 1, wherein the pivotal connection between the first and second members of the support strut is adapted to limit displacement of the fourth pivot axis away from the first pivot axis, such that the support strut supports the second support in its deployed position.

4. A folding mechanism as claimed in claim 1, wherein a distal end of the second member of the support strut engages a portion of the second support when the support strut is in its second state to limit displacement of the fourth pivot axis away from the first pivot axis, such that the support strut supports the second support in its deployed position.

5. A folding mechanism as claimed in claim 1, wherein the second support is arranged to pivot with respect to the first support from its folded to its deployed positions in a first direction, means being provided for limiting said pivotal movement of the second member with respect to said first member in said first direction, wherein the support strut is arranged such that the second pivot, fourth pivot and third pivot are arranged on a common line when said second member reaches the limit of pivotal movement thereof defined by said limiting means.

6. A folding mechanism as claimed in claim 1, wherein the actuator comprises a linear actuator.

7. A folding mechanism as claimed in claim 6, wherein the actuator comprises a double acting hydraulic ram.

8. A folding mechanism as claimed in claim 6, wherein the actuator extends between the first support and the second member of the support strut.

9. A folding mechanism as claimed in claim 8, wherein the actuator is coupled to the first support at a location between the first pivot axis and the second pivot axis such that extension of the actuator to a fully extended position displaces the support strut from its first state to its second state.

10. A material processing apparatus comprising at least one foldable component being foldable by at least one folding mechanism as claimed in claim 1.

11. A hopper for a material processing apparatus, said hopper comprising at least one foldable flare and at least one folding mechanism for folding said at least one foldable flare, said folding mechanism comprising:

a first support;

a second support pivotably coupled to the first support;

an actuator operable to pivot said second support relative to said first support about a first pivot axis between a deployed position and a folded position; and an elongate support strut extending between said first and second supports, the support strut being adapted to permit movement of said second support about said first pivot axis when the support strut is in a first state, the support strut being adapted to retain said second support in said deployed position when the support strut in a second state;

the support strut being coupled to the actuator such that the support strut is reconfigured between its first and second states as the actuator is operated to pivot the second support between its folded and deployed positions.

* * * * *